Figure 1:
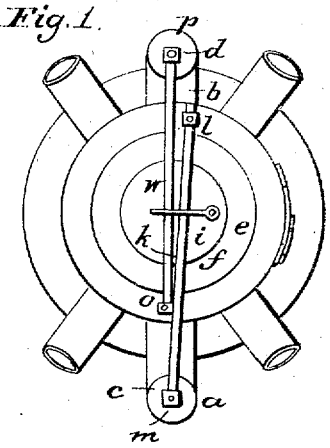
Figure 2:
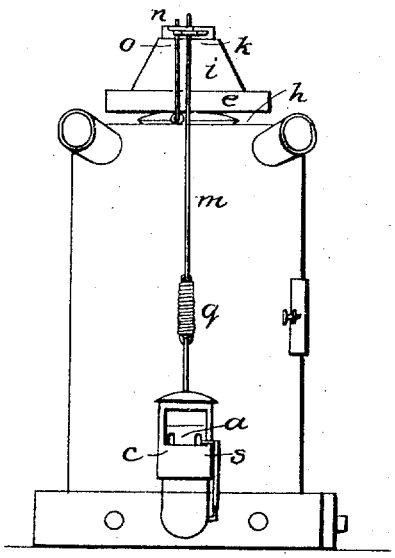
Figure 3:
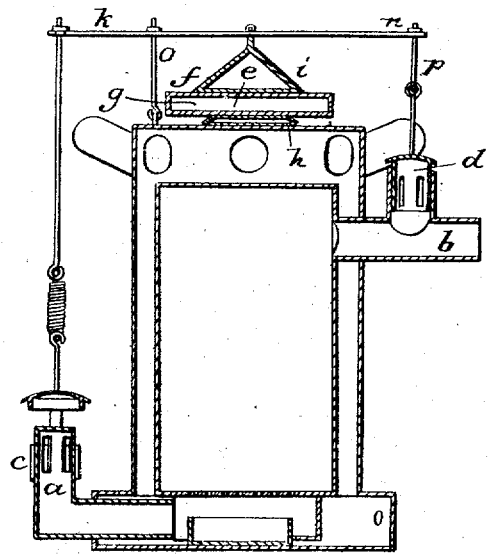

J. BRIGGS.

Damper.

No. 1,671. Reissued May. 17, 1864.

UNITED STATES PATENT OFFICE.

JOHN BRIGGS, OF ROXBURY, MASSACHUSETTS.

IMPROVEMENT IN DRAFT-REGULATORS.

Specification formingpart of Letters Patent No. 41,598, dated February 16, 1864; Reissue No. 1,671, dated May 17, 1874.

*To all whom it may concern:*

Be it known that I, JOHN BRIGGS, of Roxbury, in the county of Norfolk and State of Massachusetts, have made a new and useful invention for Regulating the Draft of Stoves, Furnaces, &c.; and I do hereby declare that the following, taken in connection with the drawings which accompany and form part of this specification, is a description of my invention sufficient to enable those skilled in the art to practice it.

My invention relates principally to the regulation of the currents of air supporting combustion in the common stoves and furnaces used in warming buildings, though it may be employed to control the valves of steam or hot-water heating apparatus, or for any heating apparatus used either in warming buildings or for manufacturing purposes.

The general purpose of the improvement is to regulate the temperature of apartments by an attachment to the stove or furnace operated upon by the heat therefrom to open and close the heat-controlling valves or dampers; and the invention consists in the employment of an air-tight drum or box, or a series of air-tight drums or boxes, having flexible or expanding heads, which shall expand or contract by the increase or diminution of heat from the stove, one or more of such heads being connected to and operating the valves or dampers of the heating apparatus, as I will proceed to describe.

The drawing illustrates my invention as applied to a common hot-air furnace, the general construction and operation of which, being well known, need not be described.

*a* denotes the inlet, and *b* the outlet, passages, the former having a valve, *c*, to regulate the induction of air to support combustion, and the latter being provided with a valve, *d*, and either or both of these valves may be used, as may be deemed necessary, or a common damper may be substituted for the valve *a*. Over the hot air chamber of the furnace, or in any other suitable position with respect to the furnace, and so as to be effected by the heat therefrom, I place an air-tight drum, *e*. This drum is made shallow in depth, and with a large end-surface, as seen in the drawings, the heads *f g* being flexible or capable of being easily collapsed or expanded. The contracted or shallow form given to the drum causes a large surface to be exposed to the heat from the stove, which heat quickly expands the air within the drum and forces outward the heads thereof. A disk or shallow drum, *h*, may rest upon the furnace for supporting the drum *e*, and a conical or tapering box, *i*, is placed on top of the drum, as seen in the drawing. A lever, *k*, passes over and rests upon the top of this cone, the lever being affixed to or connected with the cone in any suitable manner, or merely resting thereupon. One end of this lever is supported on a stationary rod, *l*, while the other end has depending from it a rod, *m*, which is attached at its lower end to the inlet-valve *c*. Another lever, *n*, turning upon a fulcrum, *o*, also rests upon the top of the cone, and has a rod, *p*, extending from its outer end to the flue-valve *d*. Either or both these levers may be used as circumstances may require. A spring, *q*, and a stop and guide-rod, *s*, are shown in connection with one of the valves, which devices may be used to limit the extent of vertical movement of the valve, while the rod *s* also serves to guide the valve or keep it from rotating. A simple standard may be placed on the drum *e*, instead of the cone *i*, for the levers to rest upon, or so that the action of the drum-head shall actuate the levers.

The operation of the invention is as follows: The heat from the stove, as it strikes the adjacent head of the drum, expands the inclosed air and drives the heads outward. This lifts the cone or standard on top of the drum, which actuates the levers *k n* and lifts the valves *c d*. Raising the valve *c* closes or diminishes the draft-openings, which diminishes the supply of air to the fire and the heat thrown off thereby, while a similar result is effected by raising the valve *d*, which opens the passages into the flue. As the heat diminishes, the drum-heads draw together, letting the levers and valves down again, opening or enlarging the draft-openings, and closing the flue-openings. Adjusting screws and nuts being placed on the valve-rods, by a slight attention to adjustment of the valves when the drum is first applied to the stove, the arrangement of the drum and levers enables the air of the room to be kept at a very even temperature, neither allowing it to get too hot or too cold. It not only insures a uniform and healthy temperature, but it effects a great saving of fuel, and the coal is never melted.

The invention is simple and inexpensive, and is entirely self-regulating, requiring no care, and giving no trouble or inconvenience such as is encountered in the use of fluid-regulators, which have been heretofore to some extent employed.

The head of the drum may be directly connected with the valve or valves of the heating apparatus without the intervention of the lever, though I prefer to use a lever, substantially as shown.

The sensitiveness of the inclosed air to expansion and contraction from heat renders the apparatus much better adapted to its purpose than are rods and other similar contrivances which have sometimes been used to operate the valve and dampers of stoves, furnaces, &c., by their expansion and contraction, consequent upon changes of temperature.

Any desired amount of movement necessary to work the valves may be obtained by modification of the leverage or by modifying the area and flexibility of the drum-heads or by the employment of several flexible headed drums in combination.

I claim—

The employment of a flexible-headed air-tight drum connected with and operating the valves or draft-passages of a heating apparatus, substantially as set forth.

JOHN BRIGGS.

Witnesses:
F. GOULD,
S. M. MCINTIRE.